(12) United States Patent  
Arai et al.

(10) Patent No.: US 6,527,642 B1
(45) Date of Patent: Mar. 4, 2003

(54) POWER TRANSMISSION COUPLING AND POWER TRANSMISSION APPARATUS

(75) Inventors: Hirokazu Arai, Yamatokoriyama (JP); Takeshi Tsuda, Tondabayashi (JP); Junya Ooitsu, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/613,865

(22) Filed: Jul. 11, 2000

(30) Foreign Application Priority Data

Jul. 15, 1999 (JP) .......................................... 11-201893
May 17, 2000 (JP) ....................................... 2000-145306

(51) Int. Cl.⁷ .............................. B62D 5/04; F16D 3/04
(52) U.S. Cl. ....................................... 464/104; 180/444
(58) Field of Search .................................. 464/102, 104, 464/105; 180/443, 444; 384/495, 519, 535

(56) References Cited

U.S. PATENT DOCUMENTS

| 1,162,125 A | * 11/1915 | Bassett ........................ 384/535 |
| 1,526,709 A | * 2/1925 | Keyser ........................ 384/535 |
| 1,643,156 A | * 9/1927 | Farmer ........................ 384/519 |
| 3,957,144 A | * 5/1976 | Opyrchal ................ 384/535 X |
| 4,730,513 A | 3/1988 | Heinrich et al. |
| 5,071,329 A | 12/1991 | Sano et al. |
| 5,082,299 A | * 1/1992 | Beattie .................... 384/519 X |
| 5,131,827 A | * 7/1992 | Tasaka |
| 5,445,238 A | * 8/1995 | Chikuma et al. ........... 180/444 |
| 5,800,070 A | * 9/1998 | Nilsson et al. .............. 384/535 |
| 6,044,723 A | * 4/2000 | Eda et al. ............... 180/443 X |
| 6,431,601 B2 | * 8/2002 | Maekawa ............... 180/443 X |
| 2001/0040067 A1 | * 11/2001 | Murakami et al. .......... 180/444 |
| 2002/0017420 A1 | * 2/2002 | Kinme et al. ................ 180/444 |

FOREIGN PATENT DOCUMENTS

| EP | 0 502 217 A1 | 9/1992 |
| EP | 0 657 340 A1 | 6/1995 |
| JP | 2000/43739 | 2/2000 |
| JP | 2001-355644 A | * 12/2001 |

* cited by examiner

Primary Examiner—Greg Binda
(74) Attorney, Agent, or Firm—Rabin & Berdo, P.C.

(57) ABSTRACT

A power transmission coupling comprises a power transmission member having first and second ends. The first and second ends are respectively connected to ends of corresponding shafts through corresponding first and second sliding pairs. The first and second sliding pairs are different in sliding direction from each other. The power transmission member is made of a fiber-reinforced synthetic resin of a polymer alloy comprising polyamide MXD6 and polyphenylene ether, to which glass fibers are being blended.

12 Claims, 11 Drawing Sheets

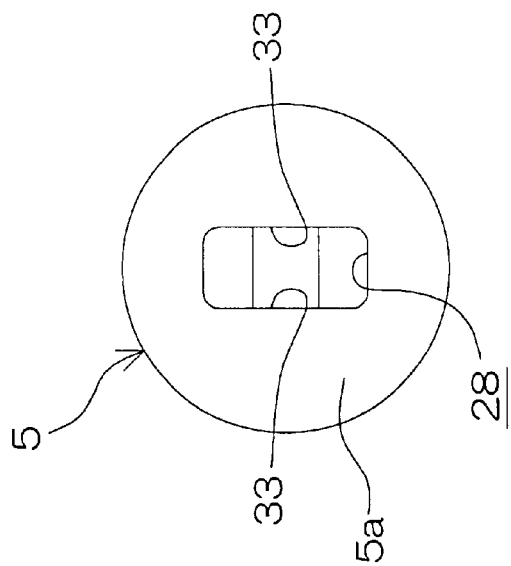
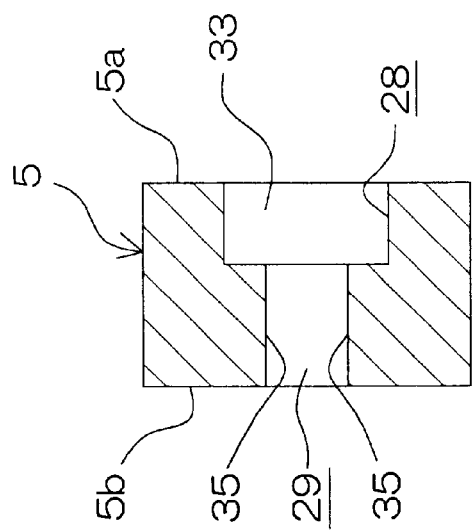
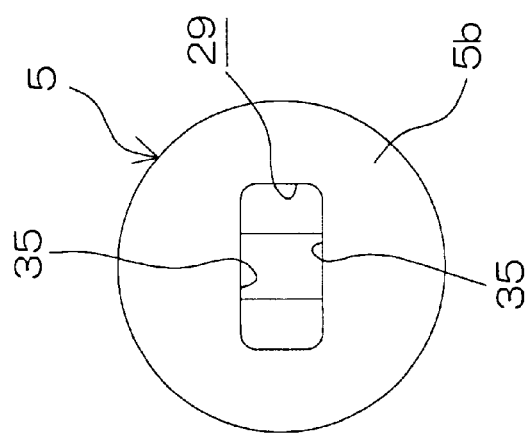

POWER TRANSMISSION COUPLING AND POWER TRANSMISSION APPARATUS

CROSS REFERENCE TO RELATED APPLICATION

This application claims priority benefits under 35 USC §119 of Japanese Patent Applications Serial No. 11-201893, filed on Jul. 15th 1999 and Ser. No. 2000-145306, filed on May 17th 2000, the disclosures of which are incorporated herein by reference.

BACKGROUND OF THE INVENTION

1. Field of the Invention

The present invention relates to a power transmission coupling and a power transmission apparatus.

2. Description of Related Arts

As a power steering apparatus for a motor vehicle to which a steering assisting force is given from an electric motor, there is known apparatus comprising a first steering shaft connected to the steering wheels, and a second steering shaft connected to the first steering shaft through a torsion bar and also connected to the steering mechanism. This apparatus is arranged in the following manner. A torque sensor detects the amount of relative displacement of the first and second steering shafts in the rotation direction, and based on the result of detection by the torque sensor, the rotation of the electric motor is transmitted to the second steering shaft through a speed reduction mechanism. Accordingly, the operation of the steering mechanism according to the rotation of the steering wheels, is assisted by the rotation of the electric motor, thus lightening the steering burden upon the vehicle driver.

As the speed reduction mechanism, there is used a mechanism comprising a worm and a worm wheel. The worm shaft having the worm mounted thereon, and the second steering shaft having the worm wheel mounted thereon, are supported at their axial ends by bearings, thus preventing the worm shaft and the second steering shaft from being moved in the radial and axial directions.

Provision is made such that when the worm shaft and the worm wheel are assembled, no backlash is produced therebetween within the range of machining precision. However, when the teeth of the worm and the worm wheel are increased in wear after assembling, backlash is produced, contributing to noise.

In view of the foregoing, it is proposed, as in Japanese Patent Laid-Open Publication 2000-43739 for example, to make provision such that the worm shaft can be biased toward the worm wheel, thus successfully eliminating the backlash by biasing the worm shaft in the biasing direction by biasing means.

In the arrangement in the Publication above-mentioned, however, power transmission between the motor and the worm shaft is made with the use of spline fitting. The spline fitting hardly allows a radial displacement of the worm shaft. It is therefore practically difficult to combine the arrangement in the Publication with the backlash adjusting mechanism above-mentioned. Accordingly, the backlash adjusting mechanism above-mentioned cannot be adopted, thus failing to assure stillness.

To assure stillness, there is proposed to form a power transmission coupling by a synthetic resin. However, the synthetic resin may be insufficient in strength. In particular, when the power transmission coupling is used for the electric pump for power steering of a motor vehicle, the power transmission coupling is raised to a high temperature. Thus, the resin tends to be lowered in strength. Even though it is intended to use spline fitting for the power transmission coupling, it is difficult to form thin and strong spline teeth by a synthetic resin. Accordingly, the proposal of forming a power transmission coupling by a synthetic resin in order to assure stillness, can be realized with difficulty as far as spline fitting is used, and therefore can assure no stillness.

The problem that no stillness can be assured, is present not only in the drive system of a motor vehicle, but also in other drive system.

SUMMARY OF THE INVENTION

It is an object of the present invention to provide a power transmission coupling and a power transmission apparatus, both of which are excellent in stillness.

To achieve the object above-mentioned, the present invention provides, as a preferred aspect, a power transmission coupling comprising a power transmission member having first and second ends, which are respectively connected to ends of corresponding shafts through corresponding first and second sliding pairs, which are different in sliding direction from each other, the power transmission member above-mentioned being made of a fiber-reinforced synthetic resin of a polymer alloy comprising polyamide MXD6 and polyphenylene ether, to which glass fibers are being blended.

The use of a synthetic resin as the material of the power transmission member securely provides stillness. The polymer alloy is originally high in material strength, and its material strength is hardly lowered at high temperature. When such a polymer alloy is further reinforced with fibers, the high strength can be maintained even at high temperature. Further, the polymer alloy is reinforced with glass fibers. This is generally more economical as compared with reinforcement with other fibers than glass fibers, e.g., carbon fibers.

The polyamide MXD6 contained in the base resin is a crystalline thermoplastic polymer obtained from methaxylene diamine (MXDA) and an adipic acid, and has an aromatic ring as the backbone chain. Examples of the polyamide MXD6 include "RENY" manufactured by Mitsubishi Engineering Plastics Co., Ltd. The polymer alloy is a multi-component polymer obtained by mixing or chemically bonding polymers containing a plurality of components.

The reason why the polymer alloy comprising MXD6 and polyphenylene ether is used as the base resin, is because the advantages of both MXD6 and polyphenylene ether can profitably be utilized. More specifically, the polymer alloy can obtain the advantages of the crystalline MXD6 excellent in chemical resistance, toughness and strength and the advantages of amorphous PPE such as low water absorption, no glass transformation and high rigidity. Thus, the disadvantages of both MXD6 and PPE can be made up for.

Preferably, the concentration of the glass fibers above-mentioned is in the range of 30 to 50% by weight. A concentration less than 30% by weight causes the strength to be insufficient, while a concentration exceeding 50% by weight makes molding difficult.

The present invention provides, as a preferred aspect, a power transmission apparatus for transmitting an electric power from an electric motor, comprising: a motor shaft disposed at the electric motor; a worm shaft on which a worm is disposed; a power transmission coupling comprising a power transmission member which connects the motor shaft and the worm shaft to each other in a power transmittable manner; a driven shaft on which disposed is a worm wheel engaged with the worm; a mechanism for adjusting backlash between the worm wheel and the worm in association with the worm shaft; and first and second sliding pairs which respectively connect first and second ends of the power transmission member to respective ends of the motor shaft and the worm shaft, the rotation of the motor shaft being transmitted to the driven shaft through the power transmission coupling, the worm shaft, the worm and the worm wheel, the first and second sliding pairs being different in sliding direction from each other, the first and second sliding pairs allowing the end of the worm shaft to be radially displaced at the time of backlash adjustment.

According to the embodiment above-mentioned, at the time of backlash adjustment, the end of the worm shaft is displaced in the radial direction of the power transmission coupling, and such a displacement can be allowed by the first and second sliding pairs. When the power transmission coupling having the arrangement above-mentioned is used, it becomes practically possible to incorporate, in the power steering apparatus, the mechanism for adjusting backlash in the worm mechanism as a speed reduction mechanism. This results in achievement of stillness.

BRIEF DESCRIPTION OF THE DRAWINGS

FIG. 4A is an enlarged left-side view of the power transmission coupling in FIG. 1, FIG. 4B is a section view in front elevation thereof, and FIG. 4C is a right-side view thereof;

DETAILED DESCRIPTION OF THE PREFERRED EMBODIMENT

Figure 1:
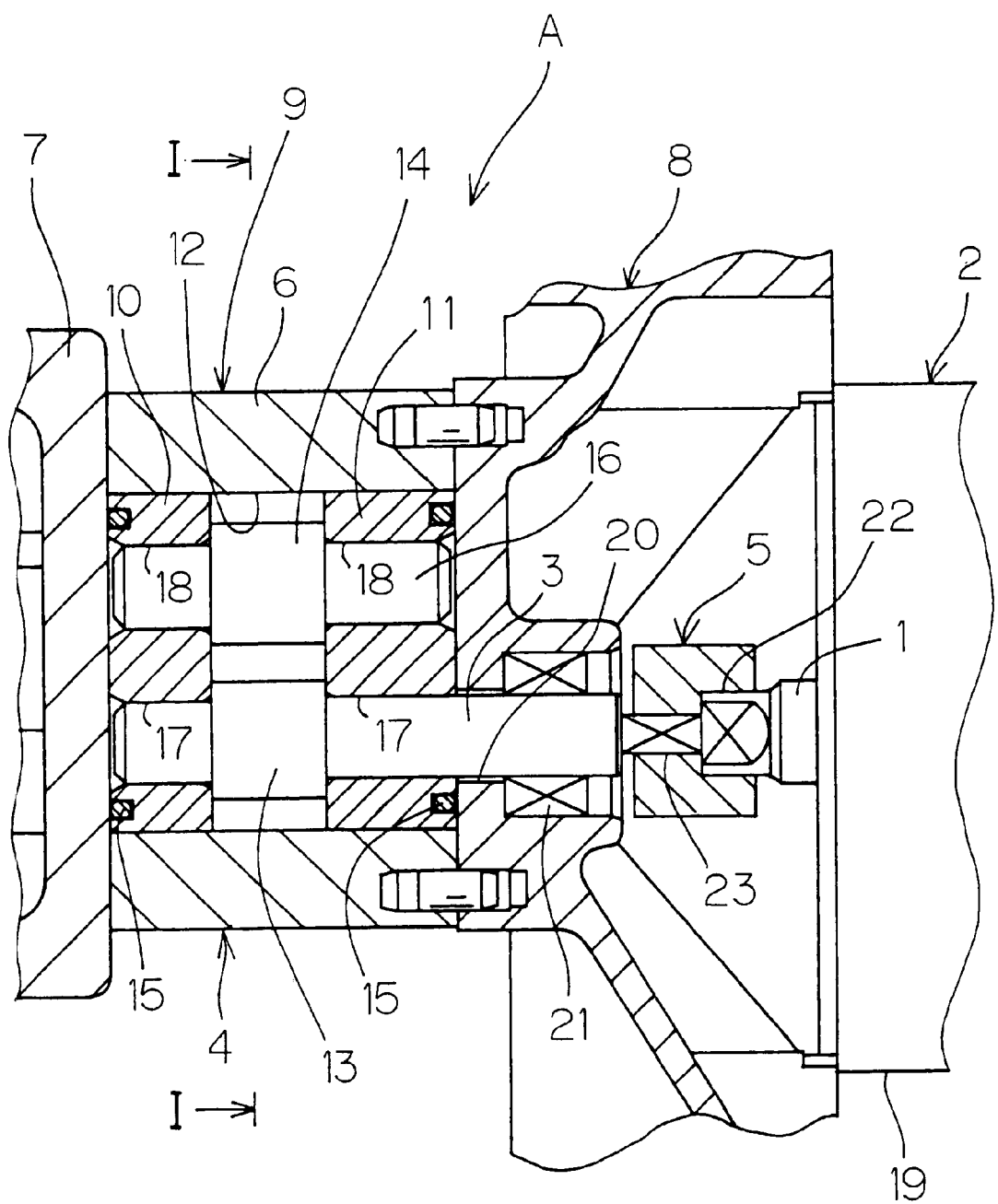
FIG. 1 is a front view illustrating the schematic arrangement of an electric pump unit comprising a power transmission coupling according to a first embodiment of the present invention.
Figure 2:
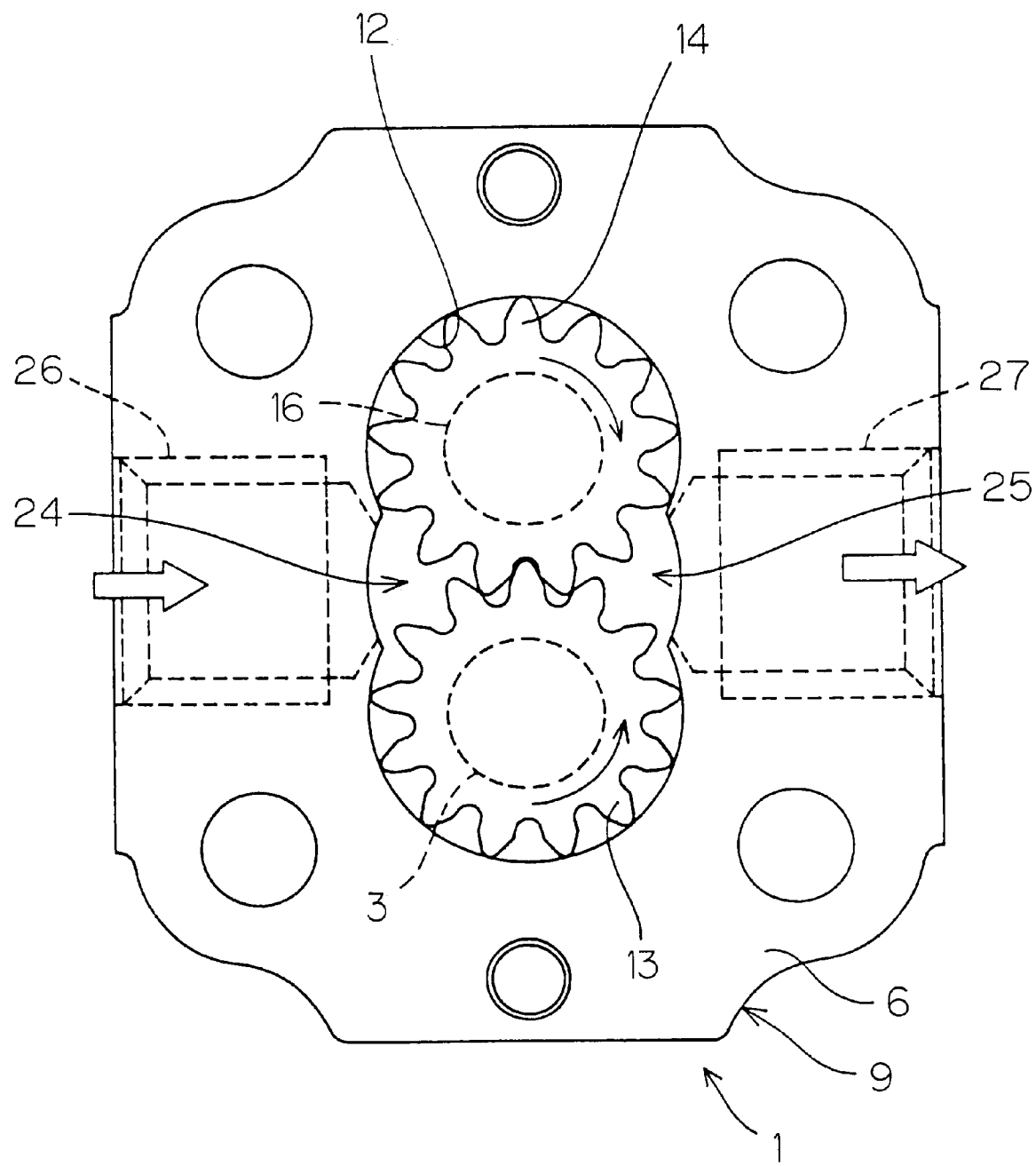
FIG. 2 is a section view in side elevation of a gear pump of the electric pump unit in FIG. 1, taken along the line I—I therein with hatching omitted.

The following description will discuss preferred embodiments of the present invention with reference to the attached drawings. FIG. 1 is a section view in front elevation of an electric pump unit comprising a power transmission coupling according to a first embodiment of the present invention. FIG. 2 is a section view in side elevation of a gear pump in FIG. 1, taken along the line I—I therein with hatching omitted.

An electric pump unit A comprises an electric motor 2 having a drive shaft (motor shaft) 1, a gear pump 4 having a driven shaft (pump shaft) 3, and a power transmission coupling 5 of the Oldham's coupling type comprising a power transmission member which connects the drive shaft 1 and the driven shaft 3 to each other in a power transmittable manner.

The power transmission coupling 5 may be formed only by a power transmission member as done in the first embodiment, but may also be formed, for example, by a power transmission member of which the surface is covered with a metallic material.

The gear pump 4 has a housing 9 comprising (i) a cylindrical body 6 having a hollow portion having an elliptic section, and (ii) a pair of covers 7, 8 which close the ends of the body 6. Inside of the housing 9, a gear chamber 12 is defined between a pair of side plates 10, 11 inserted from both sides of this hollow portion. Disposed in the gear chamber 12 are a pair of a drive gear 13 and a follower gear 14, which mesh with each other. Sealing members 15 for hermetically sealing the gear chamber 12 are interposed between the side plates 10, 11 and the corresponding covers 7, 8.

The drive gear 13 is formed integrally with the driven shaft 3, and the follower gear 14 is formed integrally with a follower shaft 16 parallel with the driven shaft 3. The driven shaft 3 and the follower shaft 16 are rotatably supported at both ends thereof in two sets of support holes 17, 18 formed in the side plates 10, 11.

The main body 19 of the electric motor 2 is secured to the cover 8. The driven shaft 3 supporting the drive gear 13 passes through an insertion hole 20 in the cover 8 and projects toward the electric motor 2. An oil seal 21 is disposed in the insertion hole 20 in the cover 8. The drive shaft 1 of the electric motor 2 and the driven shaft 3 of the gear pump 4 are substantially coaxially disposed. The end 22 of the drive shaft 1 and the end 23 of the driven shaft 3 are connected to each other, in a manner opposite to each other, through the power transmission coupling 5 above-mentioned.

In FIG. 2, arrows show the rotation directions of the drive gear 13, and the follower gear 14, which interlocks therewith. A suction chamber 24 and a discharge chamber 25 are formed at both sides of the meshing position of the gears 13, 14. The suction chamber 24 and the discharge chamber 25 are respectively connected to a suction member (not shown) and a discharge member (not shown) outside of the housing 9 respectively through a suction port 26 and a discharge port 27, which are opened at corresponding positions of the housing 9.

In the gear pump 4, an operating fluid introduced in the suction chamber 24 is received between teeth of the drive gear 13 and the follower gear 14, which face the suction chamber 24. The rotation of the gears 13, 14 causes the operating fluid to be conveyed as hermetically sealed between the gear teeth and the inner peripheral surface of the body 6. Then, the operating fluid is sent out to the discharge chamber 25.

Figure 3:
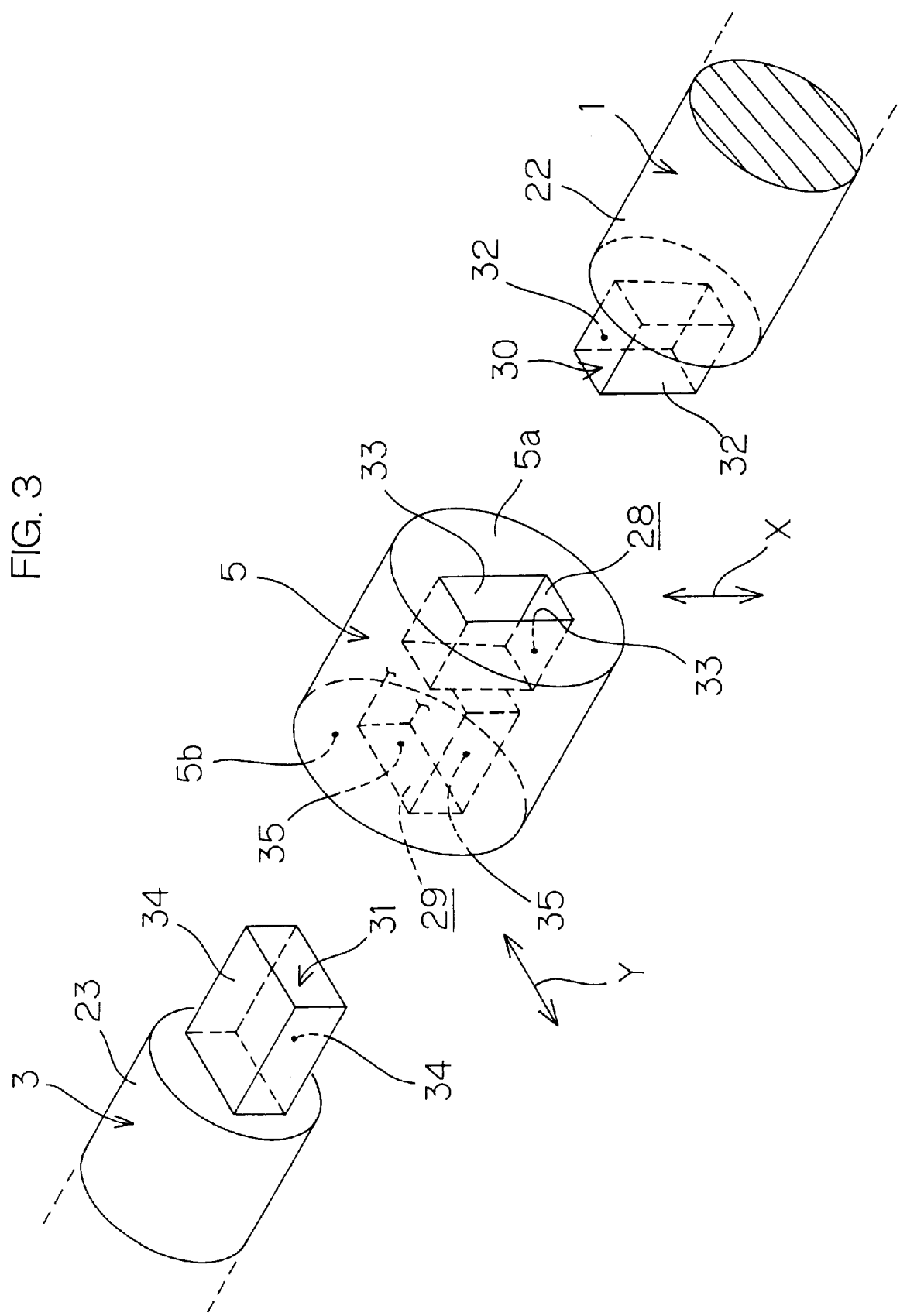
FIG. 3 is an exploded perspective view of the power transmission coupling and the ends of the shafts connected thereto in the first embodiment.

FIG. 3 is an exploded perspective view of the power transmission coupling 5 and the shafts 1, 3. FIG. 4A, FIG.

4B and FIG. 4C are respectively a left-side view, a longitudinal section view, and a right-side view of the power transmission coupling 5. The following description will be made with reference to FIG. 1, FIG. 3 and FIG. 4A to FIG. 4C.

The power transmission coupling 5 is formed by a power transmission member. This power transmission member is made of a fiber-reinforced synthetic resin including glass fibers and a polymer alloy comprising polyamide MXD6 and polyphenylene ether. The polyamide MXD6 is a crystalline thermoplastic polymer obtained from methaxylene diamine (MXDA) and an adipic acid, and has an aromatic ring as the backbone chain. This is described on page 258 of "Engineering Plastic Application Guide" published Apr. 30, 1991 authored by Takeo Yashida and published by The Nikkan Kogyo Shinbun, Ltd., Tokyo, Japan, ISBN 4-526-02916-5 C3043. Examples of the polyamide MXD6 include RENY manufactured by Mitsubishi Engineering Plastics Co., Ltd. The polymer alloy is a multi-component polymer obtained by mixing or chemically bonding polymers containing a plurality of components.

The concentration of the glass fibers above-mentioned is preferably in the range of 30~50% by weight. This concentration ratio to the rate of the glass fibers to the fiber-reinforced synthetic resin comprising the glass fibers and the polymer alloy in a matrix.

The power transmission member forming the power transmission coupling 5 is in the form of a shaft, and a guide groove 28 serving as a first coupling portion and a guide groove 29 serving as a second coupling portion are respectively formed in first and second ends 5a, 5b of the power transmission coupling 5.

The guide groove 28 is fitted to a projecting portion 30 serving as a coupled portion formed at the end 22 of the drive shaft 1 of the electric motor 2. A first sliding pair is formed by a sliding groove comprising the guide groove 28 and a slider comprising the projecting portion 30.

On the other hand, the guide groove 29 is fitted to a projecting portion 31 serving as a coupled portion formed at the end 23 of the driven shaft 3 of the gear pump 4. A second sliding pair is formed by a sliding groove comprising the guide groove 29 and a slider comprising the projecting portion 31.

The projecting portion 30 of the end 22 of the drive shaft 1 is substantially rectangular in section, and has a pair of power transmission faces 32 which are flat and parallel to each other. The width of the projecting portion 30 as measured between the power transmission faces 32 corresponds to a so-called width across flats. The guide groove 28 is formed by a hole substantially rectangular in section, and has a pair of power transmission faces 33 which are flat and parallel to each other. These power transmission faces 33 are respectively engaged with the pair of power transmission faces 32 at the end of the drive shaft 1. The length of the longer sides of the rectangle in section of the guide groove 28 is longer than the length of the longer sides of the rectangle in section of the projecting portion 30 of the end 22 of the drive shaft 1. Thus, the end 22 of the drive shaft 1 and the first end 5a of the power transmission coupling 5 can relatively be displaced along the longer sides above-mentioned.

Similarly, the projecting portion 31 of the end 23 of the driven shaft 3 is substantially rectangular in section, and has a pair of power transmission faces 34 which are flat and parallel to each other. The width of the projecting portion 31 as measured between the power transmission faces 34 corresponds to a so-called width across flats. The guide groove 29 is formed by a hole substantially rectangular in section, and has a pair of power transmission faces 35 which are flat and parallel to each other. The power transmission faces 35 are respectively engaged with the pair of flat power transmission faces 34 at the end of the driven shaft 3. The length of the longer sides of the rectangle in section of the guide groove 29 is longer than the length of the longer sides of the rectangle in section of the projecting portion 31 of the end 23 of the driven shaft 3. Thus, the end 23 of the driven shaft 3 and the second end 5b of the power transmission coupling 5 can relatively be displaced along the longer sides above-mentioned.

As shown in FIG. 3, the direction X in which the longer sides of the rectangle in section of the guide groove 28 extend, intersects, for example at right angles to, the direction Y in which the longer sides of the rectangle in section of the guide groove 29 extend. The direction X corresponds to the sliding direction of the sliding pair 28, 30, and the direction Y corresponds to the sliding direction of the sliding pair 29, 31.

In the electric pump unit A, the rotational force of the electric motor 2 is transmitted to the driven shaft 3 from the drive shaft 1 through the power transmission coupling 5. At this time, power transmission can securely be conducted through the guide grooves 28, 29 serving as the coupling portions of the power transmission coupling 5. Further, the power transmission member forming the power transmission coupling 5 is made of a fiber-reinforced synthetic resin high in high-temperature strength. This securely prevents the power transmission coupling 5 from being deformed even though the temperature around the power transmission coupling 5 becomes high. As a result, power transmission can securely be achieved. Further, the power transmission coupling 5 can be maintained in strength to a practically sufficient level even at high temperature, thus also assuring durability.

The power transmission faces 33, 35 of those guide grooves 28, 29 of the power transmission coupling in which the drive shaft 1 and the driven shaft 3 are respectively fitted, are made of a synthetic resin. It is therefore possible to prevent vibration from being transmitted between the electric motor 2 and the gear pump 4. It is also possible to prevent noise such as taps from being produced between the power transmission faces 33, 35 and the corresponding power transmission faces 32, 34.

According to the first embodiment, the fiber-reinforced synthetic resin above-mentioned is extremely economical as compared with an expensive heat-resisting synthetic resin of prior art such as polyether ether ketone (PEEK) or the like. This reduces the power transmission coupling 5 in cost.

Reinforcement with glass fibers is generally cheaper than reinforcement with fibers than other glass fibers, e.g., carbon fibers.

The high-temperature strength of the power transmission member made of the fiber-reinforced synthetic resin according to the first embodiment, can be maintained to a level substantially equal to that of a conventional power transmission coupling made of a PEEK resin. More specifically, the polyamide MXD6 is high in material strength, and the polyphenylene ether can restrain the material strength at high temperature from being lowered. Thus, the material strength of the polymer alloy containing these components is high and is hardly lowered even at high temperature. Further, it is considered that the reinforcement of the polymer alloy with glass fibers enables the high strength to be securely maintained even at high temperature.

Because the concentration of glass fibers is determined in the range of 30~50% by weight, the high-temperature strength of the power transmission coupling can be maintained to a practically sufficient level. As shown in (3) and (4) of Example 1 to be discussed later, it was understood that no problem was found in Example 1 as to break strength and impression depth at high temperature.

As to the concentration of glass fibers, the strength is insufficient with the concentration less than 30% by weight. On the other hand, with the concentration exceeding 50% by weight, molding is difficult and the molded article may be defective in external appearance. Therefore, the range of 30~50% by weight is preferable.

The power transmission member made of the fiber-reinforced synthetic resin of the first embodiment, is superior in chemical resistance to a general power transmission member made of a polyamide resin.

Because of its cheap price, stillness and high-temperature strength, the power transmission coupling 5 of the present invention can suitably be used for driving the gear pump 4 used in a power steering apparatus for a motor vehicle.

In the first embodiment above-mentioned, the guide grooves 28, 29 as sliding grooves are used for the first and second coupling portions of the power transmission coupling 5, and the projecting portions 30, 31 as sliders are used for the coupled portions of the corresponding drive shafts 1, 3. However, there may be used sliders (projecting portions) as the coupling portions, and sliding grooves (guide grooves) as the coupled portions.

The power transmission coupling 5 can be used not only for driving the gear pump 4, but also for driving other known rotary-type pumps and for coupling, for power transmission, the driving shaft and the driven shaft to each other in other driving systems.

Figure 5:
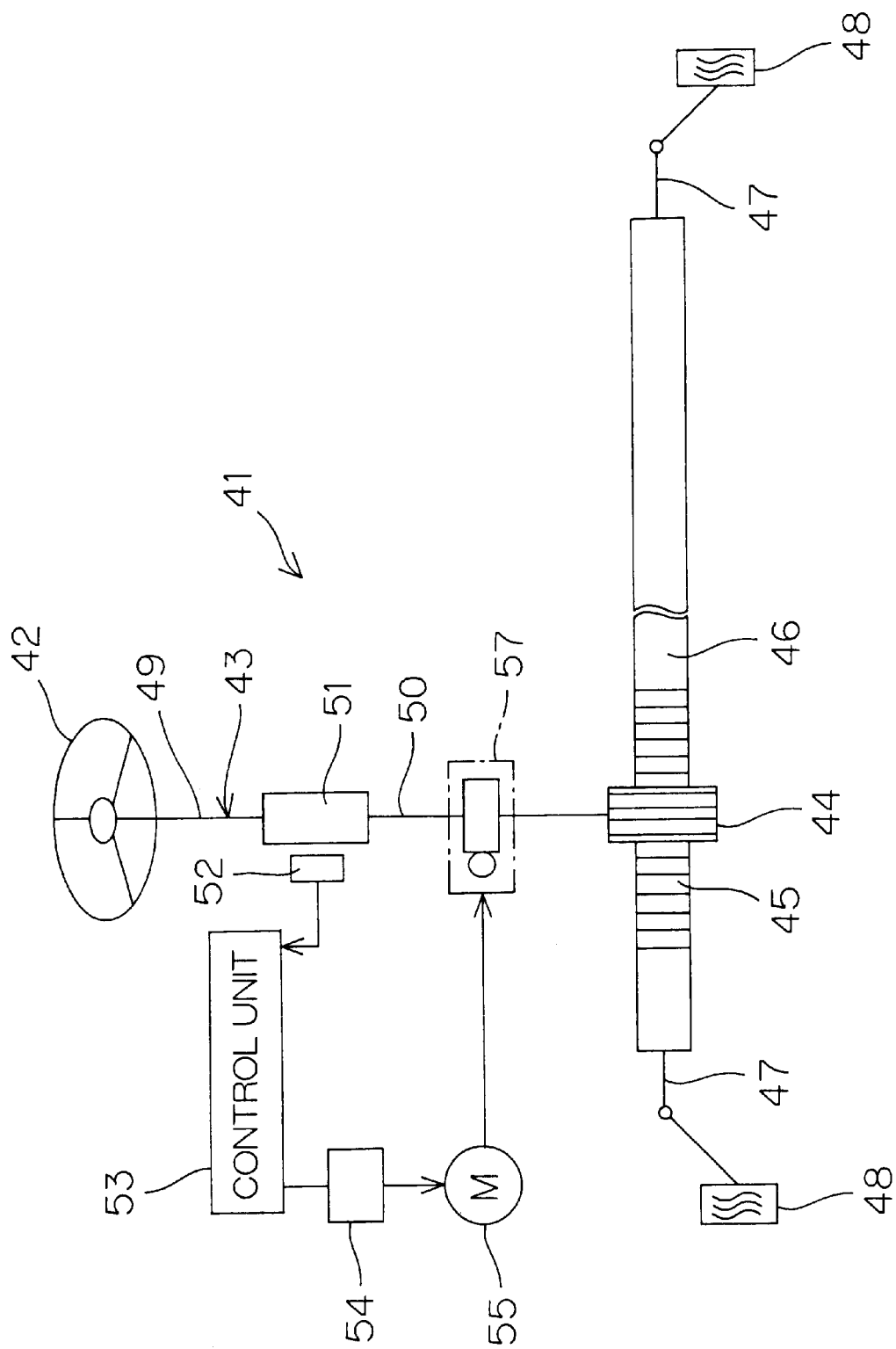
FIG. 5 is a diagram schematically illustrating the arrangement of a power steering apparatus according to a second embodiment of the present invention.

FIG. 5 is a schematic view illustrating the arrangement of an electrically-driven power steering apparatus 41 of a second embodiment of the present invention, to which a steering assisting force is given from an electric motor. The power steering apparatus 41 comprises a steering shaft 43 coupled to a steering wheel 42, a pinion gear 44 formed at the tip of the steering shaft 43, a rack gear 45 meshed with the pinion gear 44, and a rack shaft 46 extending in the transverse direction of a vehicle body.

Each tie rod 47 is connected to each end of the rack shaft 46, and is also connected to each vehicle wheel 48 through each knuckle arm corresponding to each tie rod 47. When the steering wheel 42 is operated to rotate the steering shaft 43, this rotation is converted by the pinion gear 44 and the rack gear 45 into a linear motion of the rack shaft 46 in the transverse direction of the vehicle body. This achieves the steering of the vehicle wheels 48.

The steering shaft 43 is divided into a first steering shaft 49 which is cylindrical and which is connected to the steering wheel 42, and a second steering shaft 50 connected to the pinion gear 44. The first and second steering shafts 49, 50 are coaxially connected to each other through a torsion bar 51.

Figure 6:
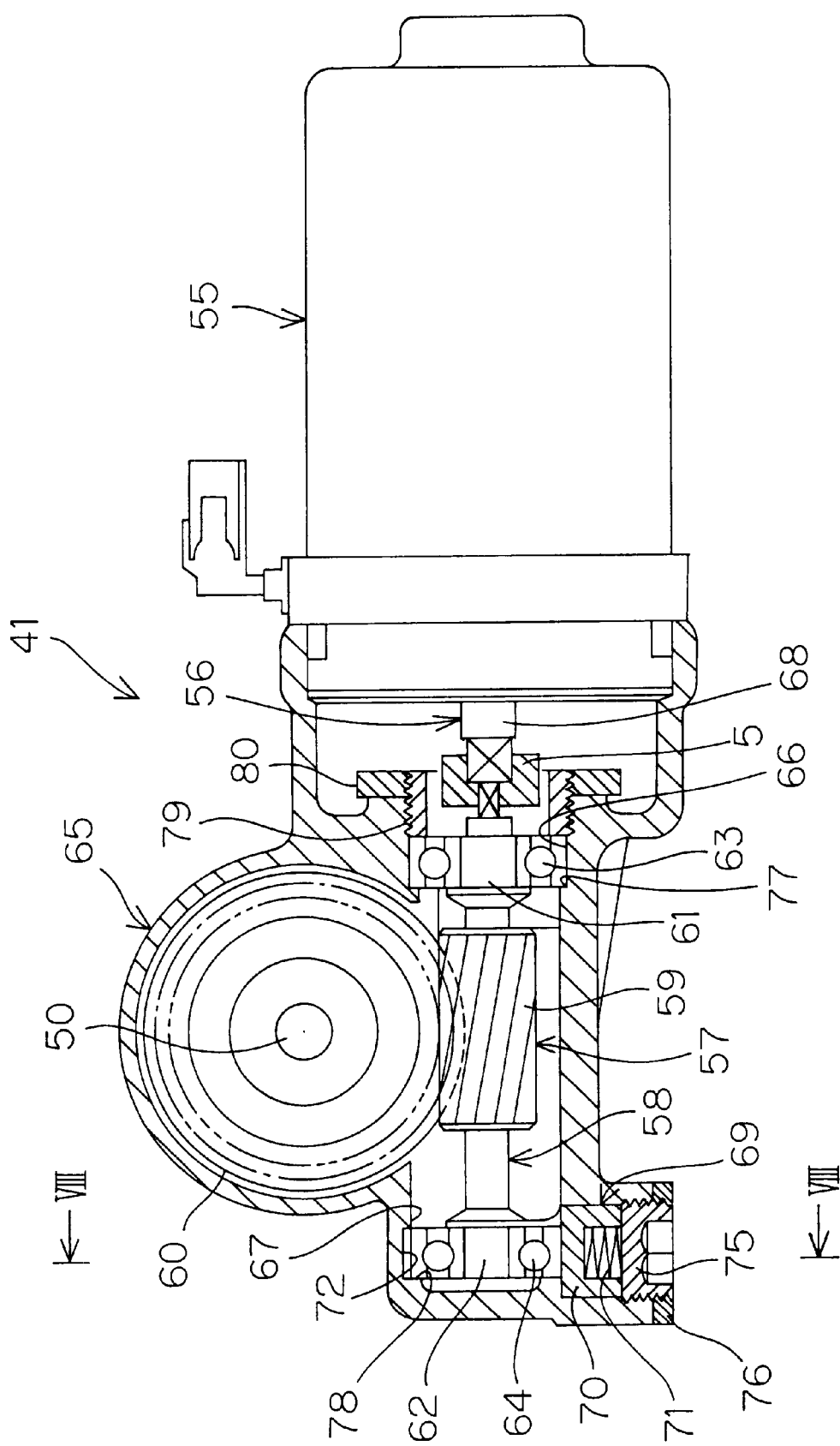
FIG. 6 is a section view of an electric motor, a speed reduction mechanism and a backlash adjusting mechanism in the second embodiment.

There is disposed a torque sensor 52 for detecting a steering torque based on the relative rotational displacement of the first and second steering shafts 49, 50 connected to each other through the torsion bar 51. The torque detection result obtained by the torque sensor 52 is given to a control unit 53. Based on the torque detection result, the control unit 53 controls, through a driver 54, the voltage applied to an electric motor 55 for steering assistance. Referring now also to FIG. 6, the rotation of a motor shaft 56 of the electric motor 55 is transmitted to the second steering shaft 50 through a speed reduction mechanism 57 comprising a worm mechanism, thus assisting the steering.

The speed reduction mechanism 57 comprises a worm 59 formed integrally with a worm shaft 58 at its intermediate portion in the axial direction, and a worm wheel 60 engaged rotatably integrally with the second steering shaft 50, the worm shaft 58 being connected to the motor shaft 56 of the electric motor 55.

The worm shaft 58 is disposed as intersecting (crossing) the axis of the second steering shaft 50. First and second ends 61, 62 of the worm shaft 58 which are opposite to each other in the axial direction thereof, are rotatably supported in first and second bearing holes 66, 67 in a gear housing 65 through first and second bearings 63, 64 comprising ball bearings.

The worm 59 is formed integrally with the worm shaft 58 at its intermediate portion between the first and second bearings 63, 64. The first end 61 of the worm shaft 58 is connected to the end 68 of the motor shaft 56 through a power transmission coupling 5.

Figure 7:
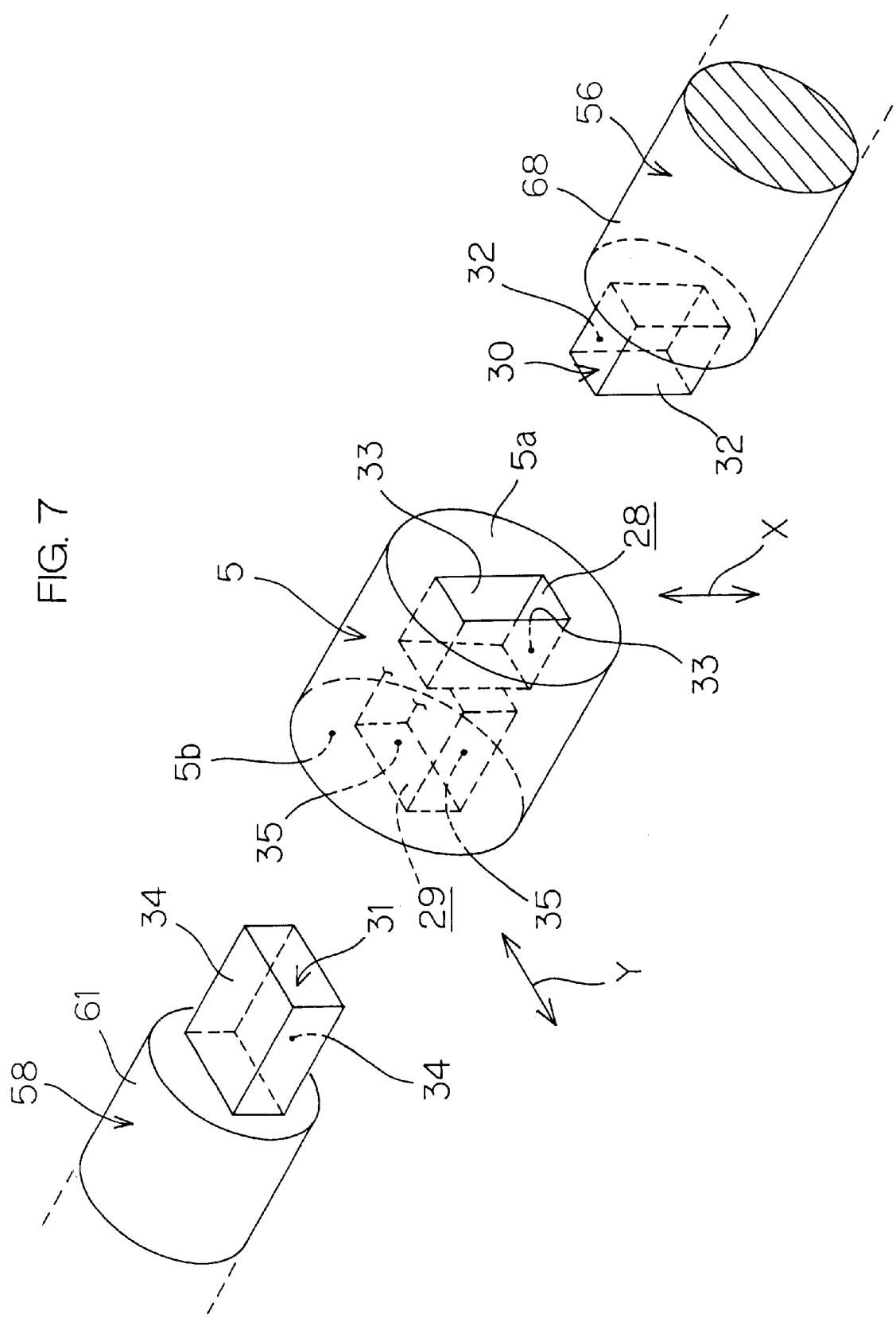
FIG. 7 is an exploded perspective view of the power transmission coupling and the ends of the shafts connected thereto in the second embodiment.

More specifically, the power transmission coupling 5 shown in FIG. 7 is similar in arrangement and material to that shown in FIG. 3. A guide groove 28 serving as a first coupling portion and a guide groove 29 serving as a second coupling portion are respectively formed in first and second ends 5a, 5b of the power transmission coupling 5. The guide groove 28 is fitted to a projecting portion 30 serving as a coupled portion formed at the end 68 of the motor shaft 56 serving as a drive shaft. A guide groove 29 is fitted to a projecting portion 31 serving as a coupled portion formed at the first end 61 of the worm shaft 58. A first sliding pair is formed by a sliding groove comprising the guide groove 28 and a slider comprising the projecting portion 30. A second sliding pair is formed by a sliding groove comprising the guide groove 29 and a slider comprising the projecting portion 31. The arrangement of the power transmission coupling 5 is otherwise the same as that of the first embodiment in FIG. 3, and the description thereof is here omitted with the same reference numerals used.

Provision is made such that the worm shaft 58 supported by the gear housing 65 can be biased toward the worm wheel 60. Thus, by biasing the worm shaft 58 toward the worm wheel 60 with the use of a backlash adjusting mechanism 69, the backlash between the worm 59 and the worm wheel 60 can be eliminated.

More specifically, provision is made such that the second bearing 64 supporting the second end 62 of the worm shaft 58, can be biased toward the worm wheel 60. The backlash adjusting mechanism 69 comprises (i) a receiving member 70 which receives the peripheral surface of the outer ring of the second bearing 64, and (ii) a biasing member 71, comprising a compression coiled spring for example, for resiliently biasing the second end 62 of the worm shaft 58 toward the worm wheel 60 through the receiving member 70 and the second bearing 64.

Figure 8:
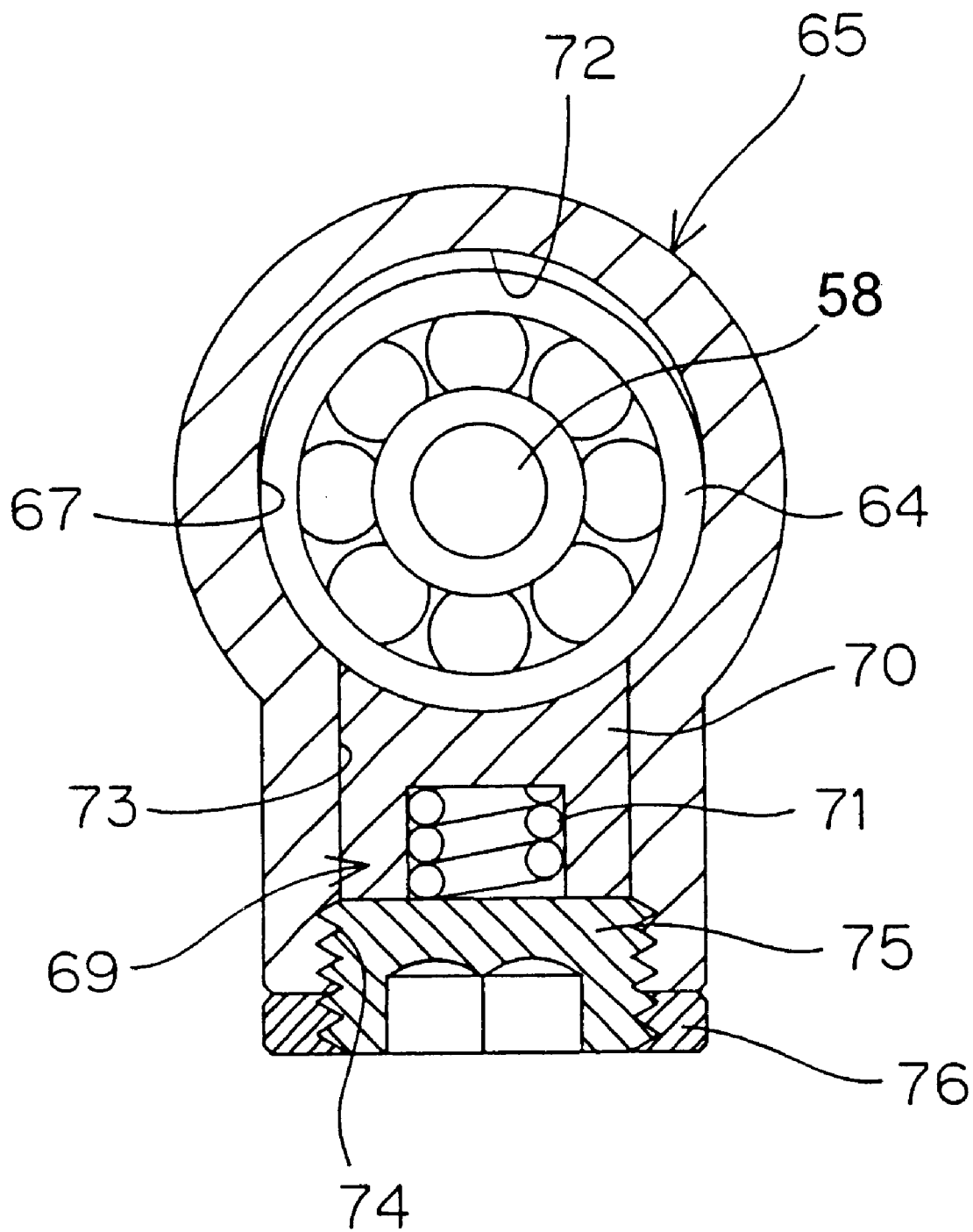
FIG. 8 is a section view taken along the line VIII—VIII in FIG. 6.

Referring now also to FIG. 8, the second bearing 64 can be biased into an arcuate concave portion 72, formed in the second bearing hole 67, which can allow the second bearing 64 to move. There is formed a housing hole 73 which opens outside of the gear housing 65 from the side opposite to the concave portion 72 in the second bearing hole 67. This housing hole 73 houses the receiving member 70 in a manner movable toward the second bearing 64.

A threaded portion 74 is formed at the inlet of the housing hole 73. The backlash adjusting mechanism 69 further comprises a screw 75 threaded into the threaded portion 74 and a lock nut 76 which locks the screw 75. The lock nut 76 is fastened, as threadedly connected to the screw 75, at the inlet edge of the housing hole 73.

By operating the screw 75 with the lock nut 76 loosened, the flexure of the biasing member 71, e.g., a compression coiled spring, can be adjusted, thus enabling the biasing force of biasing the worm 59 toward the worm wheel 60 to be adjusted. By the biasing force thus adjusted, the receiving member 70 can be moved to bias the second bearing 64 toward the concave portion 72.

The bias amount of the second end 62 of the worm shaft 58 toward the worm wheel 60, is about 30 microns for example.

Provision is made such that the first and second bearings 63, 64 respectively come in contact with first and second regulating members 77, 78 formed at the gear housing 65. This regulates the movement of the first and second bearings 63, 64 in the direction in which a thrust load is exerted. Threadedly inserted into the first bearing hole 66 is a screw 79 for biasing the outer ring of the first bearing 63 toward the first regulating member 77. The screw 79 is locked in the first bearing hole 66 with the use of a lock nut 80. The operating force of the screw 79 is transmitted from the first bearing 63 to the worm shaft 58 to prevent the worm shaft 58 from being shaken in the axial direction.

For assembling the worm shaft 58, the screw 75 is first operated to move the second bearing 64, causing the worm 59 to come in contact with the worm wheel 60, and by rotating the worm wheel 60, it is made sure that no backlash is being produced. Then, the lock nut 76 is fastened to hold the state thus adjusted. It is therefore possible to successfully eliminate backlash with no influence of dimensional errors of parts such as the worm 59 and the like. This reduces the rate of rejects at the time of production, improving the yield.

When the teeth of the worm 59 and the worm wheel 60 are increasingly worn to produce backlash, the screw 79 and the lock nut 80 are loosened to release the restriction of the second bearing 64. Then, the second bearing 64 and the worm shaft 58 are biased toward the concaved portion 72 by the force of the biasing member 71, thus eliminating the backlash.

When the backlash cannot be eliminated only by the force of the biasing member 71, the lock nut 76 is loosened and the screw 75 is operated to adjust the flexure of the biasing member 71, causing the second bearing 64 to be biased toward the concave portion 72. Thus, the backlash can successfully be eliminated.

At the time of backlash adjustment, even though the first end 61 of the worm shaft 58 is radially displaced by the amount corresponding to the idle of the first bearing 63, the power transmission coupling 5 can absorb such a displacement. Accordingly, it is practically possible to incorporate the backlash adjusting mechanism 69 in the power steering apparatus 41, thus achieving stillness.

Figure 9:
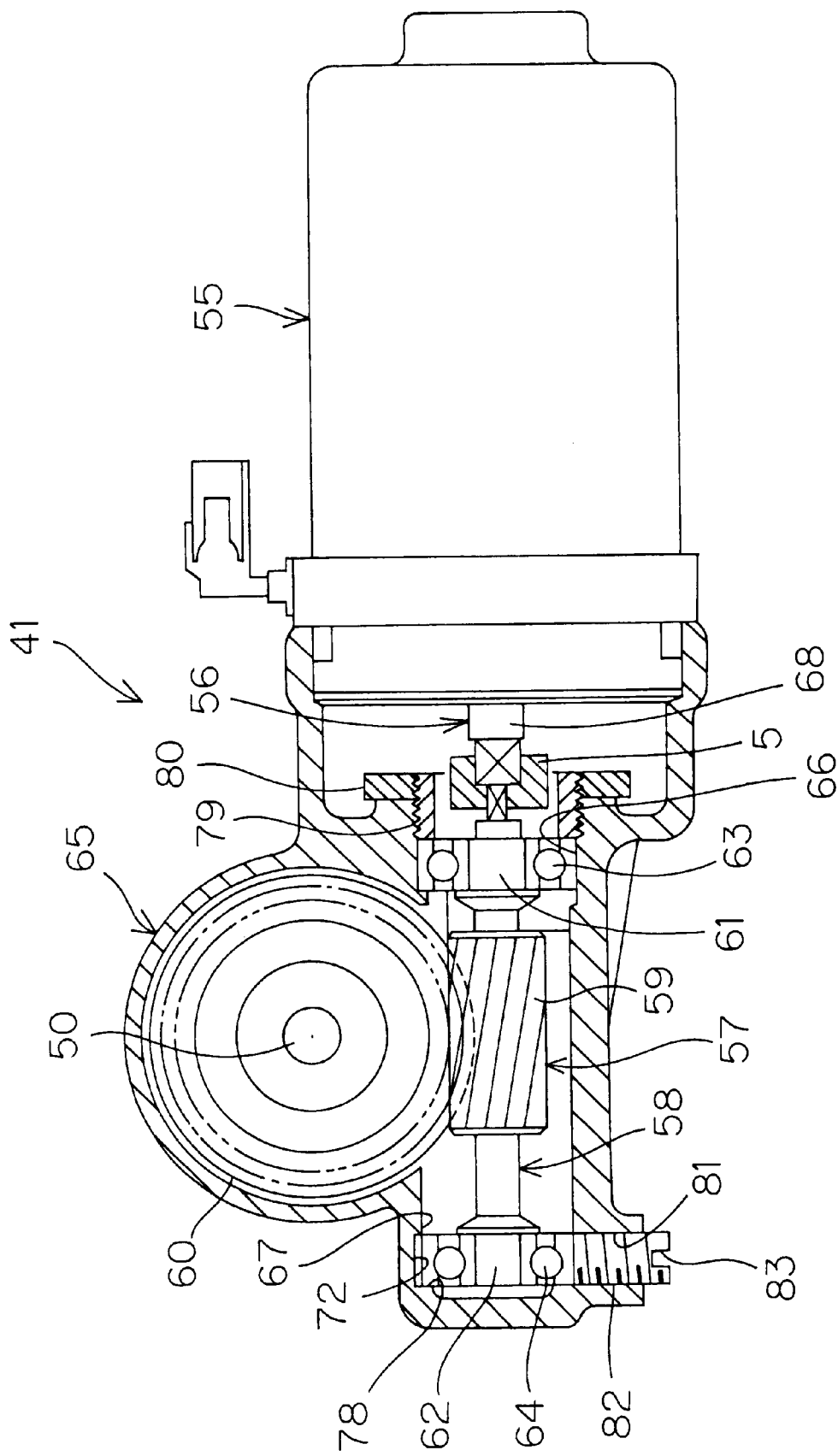
FIG. 9 is a section view of an electric motor, a speed reduction mechanism and a backlash adjusting mechanism of a power steering apparatus of a third embodiment of the present invention.

FIG. 9 shows a power steering apparatus of a third embodiment of the present invention. According to this third embodiment, a backlash adjusting mechanism is formed by a screw 82 which is threaded into a screw hole 81 in a gear housing 65 and which comes in contact with the outer peripheral surface of the outer ring of a second bearing 64.

An operating portion 83 formed by a groove for example, is formed at the exposed end of the screw 82. By rotating the screw 82 with the operating portion 83, the second bearing 64 is biased toward a concave portion 72. In the third embodiment, the first regulating member 77 is not disposed. The arrangement otherwise is similar to the second embodiment in FIG. 6, and the description thereof is here omitted with the same reference numerals used.

For assembling the worm shaft 58 in the third embodiment, with the lock nut 80 and the screw 79 loosened the screw 82 is operated to move the second bearing 64 such that the worm 59 comes in contact with the worm wheel 60. Then, by rotating the worm wheel 60, it is made sure that no backlash is being produced. By operating the screw 79, its operating force is transmitted to the outer ring, balls and inner ring of the first bearing 63, the worm shaft 58, and the inner ring, balls and outer ring of the second bearing 64. The outer ring of the second bearing 64 is pushed to the second regulating member 78 to restrict the free biasing of the second bearing 64. This causes the second bearing 64 to be maintained as adjusted by the screw 82. It is therefore possible to successfully eliminate backlash with no influence of dimensional errors of parts such as the worm 59 and the like. This reduces the rate of rejects at the time of production, improving the yield.

When the teeth of the worm 59 and the worm wheel 60 are increasingly worn to produce backlash, the screw 79 and the lock nut 80 are loosened to release the restriction of the second bearing 64. Then, the screw 82 is operated to bias the second bearing 64 toward the concave portion 72, enabling the backlash to be successfully eliminated. At the time of such backlash adjustment, even though the first end 61 of the worm shaft 58 is radially displaced by the amount corresponding to the idle of the first bearing 63, the power transmission coupling 5 can absorb such a displacement. Accordingly, it is practically possible to incorporate the backlash adjusting mechanism 69 in the power steering apparatus 41. This prevents tapping noise from being produced to improve the stillness.

Figure 10:
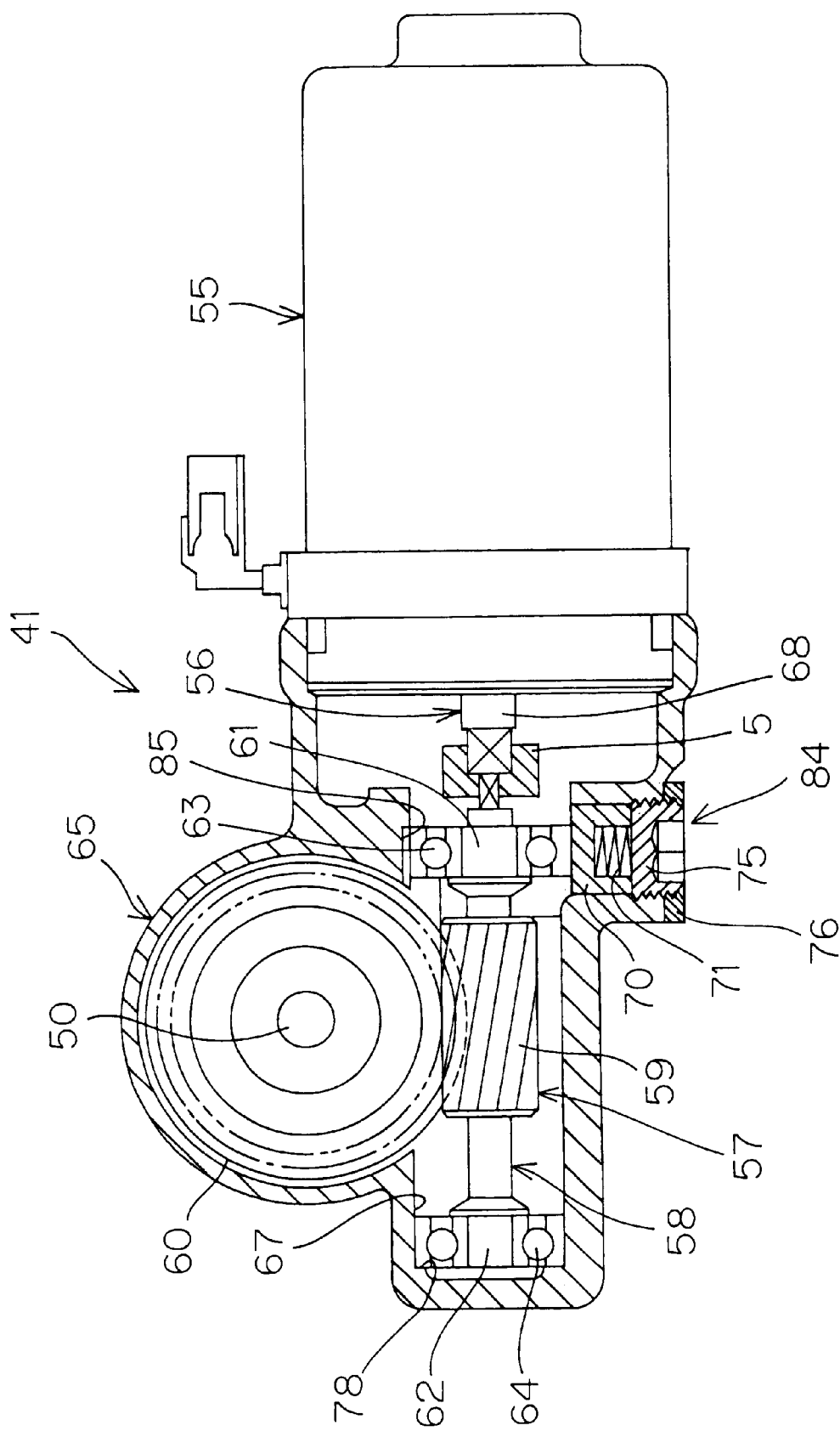
FIG. 10 is a section view of an electric motor, a speed reduction mechanism and a backlash adjusting mechanism of a power steering apparatus of a fourth embodiment of the present invention.

FIG. 10 shows a fourth embodiment of the present invention. This fourth embodiment is different from the second embodiment in FIG. 6 in that the first bearing 63 is to be biased instead of the second bearing 64. More specifically, a backlash adjusting mechanism 84 is disposed for the first bearing 63. Further, the screw 79 and the lock nut 80 in the second embodiment in FIG. 6 are eliminated in the fourth embodiment in FIG. 10. Further, the concave portion 72 for the second bearing 64 is eliminated, and a concave portion 85 is disposed for the first bearing 63. Other arrangement is the same as the second embodiment in FIG. 6, and the description thereof is here omitted with the same reference numerals used.

For assembling the worm shaft 58 in the fourth embodiment, the screw 75 is operated to move the first bearing 63, causing the worm 59 to come in contact with the worm wheel 60, and by rotating the worm wheel 60, it is made sure that no backlash is being produced. Then, the lock nut 76 is fastened to hold the state thus adjusted. It is therefore possible to successfully eliminate backlash with no influence of dimensional errors of parts such as the worm 59 and the like. This reduces the rate of rejects at the time of production, improving the yield.

When the teeth of the worm 59 and the worm wheel 60 are increasingly worn to produce backlash, the first bearing 63 and the worm shaft 58 are biased toward the concave portion 85 by the force of the biasing member 71, thus eliminating the backlash.

When the backlash cannot be eliminated only by the force of the biasing member 71, the lock nut 76 is loosened and the screw 75 is operated to adjust the flexure of the biasing member 71, causing the first bearing 63 to be biased toward the concave portion 85. Thus, the backlash can successfully be eliminated.

At the time of backlash adjustment, even though the first end 61 of the worm shaft 58 is radially displaced by the amount corresponding to the idle of the first bearing 63, the power transmission coupling 5 can absorb such a displacement. Accordingly, it is practically possible to incorporate the backlash adjusting mechanism 84 in the power steering apparatus 41, thus achieving stillness.

The present invention should not be limited to the embodiments above-mentioned, but a variety of modifications and changes can be made without departing from the spirit and the main features of the present invention.

Example 1 and Comparative Example 1

(1) As Example 1, there was produced a power transmission coupling made of a power transmission member formed by a fiber-reinforced synthetic resin, e.g., NXG5050(Grade No.) manufactured by Mitsubishi Engineering Plastics Co., Ltd., containing (i) a polymer alloy comprising polyamide MXD6 and PPE, and (ii) 50% by weight of glass fibers.

As Comparative Example 1 equivalent to prior art, there was produced a power transmission coupling made of a power transmission member formed by a heat-resisting synthetic resin containing a PEEK resin and 30% by weight of carbon fibers.

(2) Material Cost

The fiber-reinforced synthetic resin used in Example 1 is reduced in cost to about 1/10 as compared with the heat-resisting synthetic resin used in Comparative Example 1. Accordingly, Example 1 is extremely cheaper than Comparative Example 1.

(3) Break Strength Tests

There were operated gear pumps on which Example 1 and Comparative Example 1 above-mentioned were respectively actually mounted. Under the conditions of low temperature (−36■) and high temperature (120■), the load torque was gradually increased. There was measured, as break strength, the torque at which each of Example 1 and Comparative Example 1 was broken. In the tests, there were used two samples of Example 1, and two samples of Comparative Example 1. The average break strength was obtained for each of Example 1 and Comparative Example 1.

As test results, Example 1 presents 15,3 Nm as the break strength at high temperature and 21.7 Nm as the break strength at low temperature. On the other hand, Comparative Example 1 presents 18.0 Nm as the break strength at high temperature and 18.7 Nm as the break strength at low temperature.

Example 1 is somewhat inferior in break strength at high temperature to Comparative Example 1. However, its break strength at high temperature exceeds 15 Nm, which is three times 5 Nm, which is the allowable value of load torque that the power transmission coupling should stand. Thus, the break strength at high temperature of Example 1 can compare favorably with Comparative Example 1.

On the other hand, Example 1 is rather greater and therefore superior in break strength at low temperature than Comparative Example 1.

(4) Impression Depth Tests

Under the conditions of high temperature (120■) and room temperature (24■), each of torques 5 Nm, 10Nm, 15 Nm was applied to each power transmission coupling of Example 1 and Comparative Example 1, and there was measured the depth of impression produced in each power transmission coupling. In the tests, there were used six samples of Example 1 and six samples of Comparative Example 1, and the average impression depth was obtained for each case.

Figure 11:
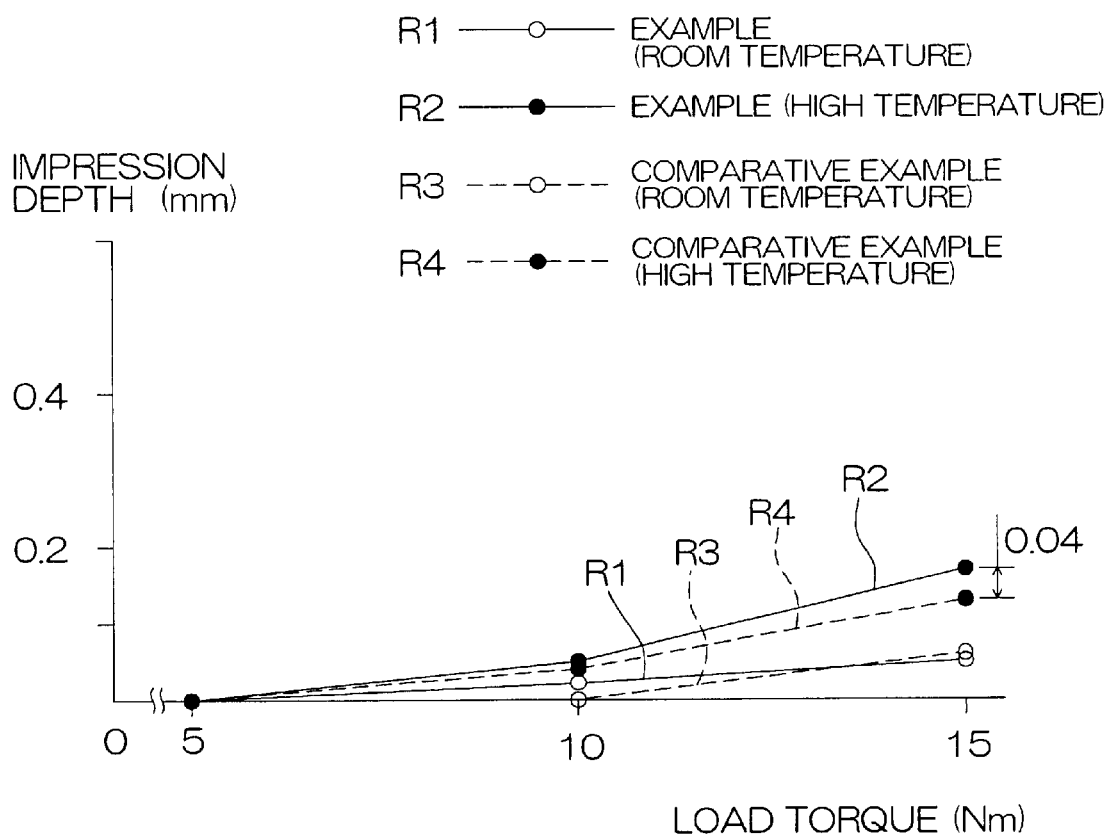
FIG. 11 is a graph illustrating the relationships between load torque and impression depth of Example and Comparative Example at high temperature and room temperature.

The test results are graphically shown in FIG. 11, in which the relationships between torque and impression depth under the temperature conditions above-mentioned, are shown by solid lines for Example 1 and by broken lines for Comparative Example 1. In FIG. 11, a ■-marked solid line R1 presents the changes in impression depth with respect to load torque at room temperature of Example 1, a ■-marked solid line R2 presents the changes in impression depth with respect to load torque at high temperature of Example 1, a ■-marked broken line R3 presents the changes in impression depth with respect to load torque at room temperature of Comparative Example 1, and a ■-marked broken line R4 presents the changes in impression depth with respect to load torque at high temperature of Comparative Example 1.

It is found that the impression depth of Example 1 under the severest condition of high temperature and high load (15 Nm) is 0.17 mm, and the difference between this and the impression depth (0.13 mm) of Comparative Example 1 under the same condition, is as small as 0.04 mm. It can therefore be seen that under the severest condition, Example 1 is substantially equivalent in impression depth to Comparative Example 1.

The impression depths of Example 1 at room temperature and at low load torque even at high temperature are further smaller than the impression depth under the severest condition, and therefore cause no trouble.

Examples 2 to 4 and Comparative Examples 2, 3

As Example 2, there was produced a power transmission coupling made of a power transmission member formed by a fiber-reinforced synthetic resin [equivalent to NXG 5030 (Grade No.) manufactured by Mitsubishi Engineering Plastics Co., Ltd.] containing a base resin of a polymer alloy comprising polyamide MXD6 and PPE, to which 30% by weight of glass fibers was being blended. As Example 3, there was produced a power transmission coupling made of a power transmission member formed by a fiber-reinforced synthetic resin containing a base resin of a polymer alloy comprising polyamide MXD6 and PPE, to which 40% by weight of glass fibers was being blended.

As Example 4, there was produced a power transmission coupling made of a power transmission member formed by a fiber-reinforced synthetic resin [equivalent to NXG5050 (Grade No.) manufactured by Mitsubishi Engineering Plastics Co., Ltd.] containing a base resin of a polymer alloy comprising polyamide MXD6 and PPE, to which 50% by weight of glass fibers was being blended.

As Comparative Examples 2 and 3, there were respectively produced power transmission couplings made of power transmission members formed by fiber-reinforced synthetic resins containing a base resin of a polymer alloy comprising polyamide MXD6 and PPE, to which 25% by weight of glass fibers was being blended for Comparative Example 2 and 55% by weight of glass fibers was being blended for Comparative Example 3.

1) Torsion Strength Tests

Tests were conducted on three samples for each of Examples 2 to 4 and Comparative Examples 2 and 3. Torsion strength was measured for each sample under the following condition, and the average was obtained for each of Examples 2 to 4 and Comparative Examples 2 and 3. The results are shown in Table 1.

Condition: The guide groove formed in one end of the power transmission member was fixed by a shaft, and the guide groove formed in the other end was twisted by a shaft.

In the torsion strength in Table 1, "G" means that the average torsion strength is not less than the allowable value, and "NG" means that the average torsion strength is less than the allowable value.

2) Wear Resistance Tests

Tests were conducted on three samples of each of Examples 2 to 4 and Comparative Examples 2 and 3. Wear resistance tests were conducted under the following condition, and wear depth values were measured. The results are shown in Table 1.

Condition: An SRV friction wear testing machine was used. Load: 40 N Displacement:
1 mm
Frequency: 83 Hz Temperature: 80■
Time: One hour As to the wear resistance in Table 1, "G" means that the average wear depth is less than the allowable value, and "NG" means that the average wear resistance is not less than the allowable value.

3) Moldability

In the resin moldability in Table 1, "VG" means that the resin moldability is very good, "G" means that the resin moldability is good, and "NG" means that the resin moldability is not good.

In Table 1, "G" or "VG" is marked for all items of Examples 2 to 4. Thus, each of Examples 2 to 4 is easy to mold and achieves stable strength and durability. As to Comparative Examples 2 and 3, there are items for which "NG" is marked. It was therefore proved that the concentration of glass fibers is preferably in the range of 30 to 50% by weight.

TABLE 1

|  | Comparative Example 2 | Example 2 | Example 3 | Example 4 | Comparative Example 3 |
| --- | --- | --- | --- | --- | --- |
| Concentration of Glass Fibers | 25% | 30% | 40% | 50% | 55% |
| Torsion Strength | NG | G | G | G | NG |
| Wear Resistance | NG | G | G | G | G |
| Moldability | G | VG | VG | G | NG |

What we claim is:

1. A power transmission apparatus for transmitting an electric power from an electric motor, comprising:

a motor shaft disposed at the electric motor;

a worm shaft on which a worm is disposed;

a power transmission coupling comprising a power transmission member which connects the motor shaft and the worm shaft to each other in a power transmittable manner;

a driven shaft on which disposed is a worm wheel engaged with the worm;

a mechanism for adjusting backlash between the worm wheel and the worm in association with the worm shaft; and first and second sliding pairs which respectively connect first and second ends of the power transmission member to respective ends of the motor shaft and the worm shaft, the rotation of the motor shaft being transmitted to the driven shaft through the power transmission coupling, the worm shaft, the worm and the worm wheel, the first and second sliding pairs being different in sliding direction from each other, the first and second sliding pairs allowing the end of the worm shaft to be radially displaced at the time of the backlash adjustment.

2. A power transmission apparatus according to claim 1, wherein the driven shaft comprises a steering shaft connected to a steering wheel, and the electric motor generates a steering assisting force.

3. A power transmission apparatus according to claim 1, wherein the sliding pairs comprise sliders and sliding grooves engaged therewith.

4. A power transmission apparatus according to claim 3, wherein each of the sliders comprises a pair of parallel power transmission faces, and each of the sliding grooves corresponding to the sliders comprises a pair of parallel power transmission faces which come in sliding contact with the pair of parallel power transmission faces of the sliders.

5. A power transmission apparatus according to claim 3, wherein the sliding grooves are formed in the power transmission coupling.

6. A power transmission apparatus according to claim 1, wherein the power transmission member is made of a fiber-reinforced synthetic resin of a polymer alloy comprising polyamide MXD6 and polyphenylene ether, to which glass fibers are being blended.

7. A power transmission apparatus according to claim 6, wherein the concentration of the glass fibers is in the range of 30 to 50% by weight.

8. A power transmission apparatus according to claim 1, wherein the power transmission coupling comprises an Oldham's coupling.

9. A power transmission apparatus according to claim 1, wherein the mechanism for adjusting backlash includes:

a receiving member for rotatably receiving an end of the worm shaft; and means for biasing the receiving member such that the worm shaft is biased toward the worm wheel.

10. A power transmission apparatus according to claim 9, wherein the receiving member comprises a bearing for rotatably supporting an end of the worm shaft.

11. A power transmission apparatus according to claim 9, wherein the biasing means comprises a compression coiled spring.

12. A power transmission apparatus according to claim 9, wherein the biasing means comprises a screw.

* * * * *